United States Patent
Tan et al.

(10) Patent No.: US 9,449,761 B2
(45) Date of Patent: Sep. 20, 2016

(54) POLYPROPYLENE FOR FILM CAPACITOR, POLYPROPYLENE SHEET FOR FILM CAPACITOR, METHOD FOR PRODUCING THE SAME, AND USES OF THE SAME

(75) Inventors: Noriko Tan, Otake (JP); Satoshi Tamura, Ichihara (JP)

(73) Assignee: PRIME POLYMER CO., LTD., Tokyo (JP)

( * ) Notice: Subject to any disclaimer, the term of this patent is extended or adjusted under 35 U.S.C. 154(b) by 171 days.

(21) Appl. No.: 13/256,622

(22) PCT Filed: Mar. 17, 2010

(86) PCT No.: PCT/JP2010/054519
§ 371 (c)(1),
(2), (4) Date: Sep. 14, 2011

(87) PCT Pub. No.: WO2010/107052
PCT Pub. Date: Sep. 23, 2010

(65) Prior Publication Data
US 2012/0010318 A1    Jan. 12, 2012

(30) Foreign Application Priority Data
Mar. 17, 2009  (JP) ................ 2009-064805

(51) Int. Cl.
H01G 4/18     (2006.01)
C08J 3/28     (2006.01)
C08L 23/12    (2006.01)

(52) U.S. Cl.
CPC ........... *H01G 4/18* (2013.01); *C08L 23/12* (2013.01); *C08L 2312/00* (2013.01); *C08L 2312/06* (2013.01); *Y02T 10/7022* (2013.01)

(58) Field of Classification Search
CPC ........... C08L 23/12; C08L 2312/00; C08L 2312/06; H01G 4/18; Y02T 10/7022
See application file for complete search history.

(56) References Cited

U.S. PATENT DOCUMENTS

| | | | |
|---|---|---|---|
| 4,687,803 A | | 8/1987 | Teramoto et al. |
| 5,476,709 A | | 12/1995 | Inoue et al. |
| 5,560,886 A | * | 10/1996 | Saito et al. .............. 264/485 |
| 5,573,840 A | | 11/1996 | Inoue et al. |
| 7,309,740 B2 | | 12/2007 | Masuda et al. |
| 7,446,147 B2 | | 11/2008 | Naito et al. |
| 8,399,536 B2 | * | 3/2013 | Abata et al. ............. 522/161 |
| 2004/0053064 A1 | | 3/2004 | Masuda et al. |
| 2008/0232026 A1 | | 9/2008 | Ward |
| 2009/0208681 A1 | | 8/2009 | Ernst et al. |
| 2010/0047544 A1 | * | 2/2010 | Busch et al. .............. 428/220 |

FOREIGN PATENT DOCUMENTS

| | | | |
|---|---|---|---|
| CN | 1788050 A | | 6/2006 |
| EP | 678527 A2 | * | 10/1995 |
| JP | 05-295130 A | * | 12/1977 |
| JP | 52-153150 A | | 12/1977 |
| JP | 54-109160 A | | 8/1979 |
| JP | S57-047305 A | | 3/1982 |
| JP | 05-968919 A | | 4/1984 |
| JP | 59-68919 A | | 4/1984 |
| JP | 61-110906 A | | 5/1986 |
| JP | 61-194810 A | | 8/1986 |
| JP | 05-295130 A | | 11/1993 |
| JP | 06-236709 A | | 8/1994 |
| JP | 07-193032 A | | 7/1995 |
| JP | 08-311268 A | | 11/1996 |
| JP | 09-235325 A | | 9/1997 |
| JP | 09-302036 A | | 11/1997 |
| JP | H10-112419 A | | 4/1998 |
| JP | 3018693 B2 | | 3/2000 |
| JP | 2001-071435 A | | 3/2001 |
| JP | 2003-025425 A | | 1/2003 |
| JP | 2003-145695 A | | 5/2003 |
| JP | 2004-175932 | | 6/2004 |
| JP | 2005-089683 | | 4/2005 |
| JP | 2006-093688 A | | 4/2006 |
| JP | 2006-143975 A | | 6/2006 |
| JP | 2007-126644 A | | 5/2007 |
| JP | 2007-250829 A | | 9/2007 |
| JP | 2008-133351 | | 6/2008 |
| JP | 2009-500479 A | | 1/2009 |
| WO | WO 2008025796 A1 | * | 3/2008 |

OTHER PUBLICATIONS

Hammound, A.N. Electron Radiation Effects on the Electrical and Mechanical Properties of Polypropylene. Nuclear Science, IEEE Transactions. vol. 34, Issue 6, pp. 1822-1826, publication date Dec. 1987.*

(Continued)

Primary Examiner — Sanza McClendon
(74) Attorney, Agent, or Firm — Foley & Lardner LLP

(57) ABSTRACT

A polypropylene for a film capacitor or a polypropylene sheet for a film capacitor which exhibits excellent stretchability when stretched into a film and provides a film having high breakdown voltage and small thermal shrinkage ratio, and which is suitable for a polypropylene film for a film capacitor and a film capacitor comprising the film.

The polypropylene for a film capacitor of the present invention is obtained by irradiating a propylene homopolymer with a radiation with an absorbed dose of 0.1 to 500 kGy, the propylene homopolymer having (1) a melt flow rate (MFR) within a range of 1 to 10 g/10 min as determined at 230° C. under a load of 2.16 kg in accordance with ASTM D1238, (2) an isotactic pentad fraction (mmmm fraction) of not less than 94% as determined using $^{13}$C-NMR, (3) an ash amount of not more than 30 ppm as obtained by completely burning the propylene homopolymer in air, and (4) a chlorine amount of not more than 10 ppm as determined by ion chromatography.

20 Claims, No Drawings

(56) References Cited

OTHER PUBLICATIONS

Polypropylene films. Polymers: A Properties Database. online. retrieved online on [Jun. 1, 2015]. retrived from internet: <URL:// https://books.google.com/books?id=S-TKBQAAQBAJ &pg=PA836&lpg=PA836 &dq=polypropylene+and+breakdown+voltage+and+irradiation &source=bl&ots=Wlc-v4shKX&sig=B-4eaVvU0pZofU2m66By8OfgOw8&hl=en&sa=X &ei=J3BsVYLFGIvHsQTm3YKYAg&ved>.*
Office Action Singapore Application No. 201106626-3 dated Oct. 4, 2012.
Chinese Office Action for Application No. 201080012175.4 dated Jul. 2, 2012 with partial English translation, 11 pages.
A. Zambelli et al., "Model Compounds and 13C NMR Observation of Stereosequences of Polypropylene", Macromolecules, vol. 8, No. 5, pp. 687-689 (Sep.-Oct. 1975).
International Search Report; PCT/JP2010/054519; 1 page; Jun. 15, 2010.
Office Action received in Japanese Application No. 2011-504858 dated Mar. 25, 2014.
Japanese Office Action dated Jan. 7, 2014, received in Japanese Application No. 2011-504858.
Extended European Search Report issued in corresponding application No. 10753544.5 dated Oct. 1, 2015.
Japanese Office Action dated Jun. 23, 2015 issued in Application No. 2014-128985.

* cited by examiner

POLYPROPYLENE FOR FILM CAPACITOR, POLYPROPYLENE SHEET FOR FILM CAPACITOR, METHOD FOR PRODUCING THE SAME, AND USES OF THE SAME

TECHNICAL FIELD

The present invention relates to a polypropylene for a film capacitor, a polypropylene sheet for a film capacitor, a polypropylene film for a film capacitor, and a film capacitor. In detail, the present invention relates to a polypropylene for a film capacitor or a polypropylene sheet for a film capacitor which exhibits excellent stretchability when stretched into a film and provides a film that has high breakdown voltage and small thermal shrinkage ratio and which is suitable for a polypropylene film for a film capacitor.

BACKGROUND ART

Polypropylene, having excellent stretching characteristics, insulation property, and voltage resistance, has been widely used for a film of a film capacitor. With the demand for the film capacitor increasing mainly in automobile fields, home electrical appliances fields and the like, in order to meet the need for the size reduction, films used therein have been demanded so as to have further improved breakdown voltage.

As a film for a film capacitor, there have been disclosed, for example, a film comprising a composition mainly composed of a high stereoregularity polypropylene (Patent Document 1), a polymer insulating material formed from a polypropylene having an ash amount of not more than 40 ppm by weight and a chlorine amount of not more than 2 ppm by weight (Patent Document 2), a film comprising a propylene polymer having an aluminum residue amount of less than 25 ppm and a boron residue amount of less than 25 ppm, and a film obtained by adding a polypropylene having a long chain branch as a masterbatch to a high stereoregularity polypropylene and then biaxially stretching the mixture (Patent Document 4).

However, none of the polypropylene with improved stereoregularity, the polypropylene with decreased impurities, and the addition of a specific polypropylene, has been able to provide a film having sufficient breakdown voltage, and thus a capacitor satisfying the market demand has not been provided.

Patent Document 5 discloses a film for a film capacitor which has a thermal shrinkage ratio in the longitudinal direction of the film falling within a specific range, the film being obtained by irradiating the polypropylene film biaxially stretched with an ultraviolet ray or an electron ray, in order to suppress "wrinkle" occurring in a heat treatment carried out during the preparation of the capacitor element and adversely affecting the life of the capacitor, to thereby maintain the performance (breakdown strength) of the capacitor.

However, the polypropylene used in the Example has a stereoregularity of approximately 91%, and thus the method using the polypropylene having a stereoregularity of approximately 91%, even if succeeding in suppressing the "wrinkle", fails to provide a film capacitor having a sufficient breakdown voltage.

CITATION LIST

Patent Document

Patent Document 1: JP-A-61-110906
Patent Document 2: JP-A-06-236709
Patent Document 3: JP-A-2009-500479
Patent Document 4: JP-A-2006-93688
Patent Document 5: JP-A-54-109160

SUMMARY OF THE INVENTION

Problem to be Solved by the Invention

The present invention has been made in order to solve the conventional techniques described above. It is an object of the present invention to provide a polypropylene for a film capacitor or a polypropylene sheet for a film capacitor which exhibits excellent stretchability when stretched into a film and provides a film having high breakdown voltage (hereinafter, also called BDV; Brakedown Voltage) and small thermal shrinkage ratio, and is suitable for a polypropylene film for a film capacitor and a film capacitor comprising the film.

Means for Solving the Problem

The present inventors made earnest study in order to solve the problem described above, and found out that a polypropylene for a film capacitor obtained by irradiating a specific propylene homopolymer (for example, powders, granules or pellets) with a radiation, preferably an electron ray or a gamma ray, more preferably an electron ray, with a specific absorbed dose; or a polypropylene sheet for a film capacitor obtained by irradiating a sheet obtained from the specific propylene homopolymer with a radiation, preferably an electron ray or a gamma ray, more preferably an electron ray, with a specific absorbed dose, has excellent stretchability when stretched into a film, and moreover, a polypropylene film for a film capacitor obtained by biaxially stretching the polypropylene for a film capacitor or the polypropylene sheet for a film capacitor has high breakdown voltage and small thermal shrinkage ratio, and is suitable for a film capacitor. The present invention has been completed based on the findings.

That is, the present invention includes the following.

A polypropylene for a film capacitor of the present invention is obtained by irradiating a propylene homopolymer with a radiation with an absorbed dose of 0.1 to 500 kGy, the propylene homopolymer having (1) a melt flow rate (MFR) within a range of 1 to 10 g/10 min as determined at 230° C. under a load of 2.16 kg in accordance with ASTM D1238, (2) an isotactic pentad fraction (mmmm fraction) of not less than 94% as determined using $^{13}$C-NMR, (3) an ash amount of not more than 30 ppm as obtained by completely burning the propylene homopolymer in air, and (4) a chlorine amount of not more than 10 ppm as determined by ion chromatography.

A polypropylene sheet for a film capacitor of the present invention is obtained by irradiating a sheet obtained from a propylene homopolymer with a radiation with an absorbed dose of 0.1 to 500 kGy, the propylene homopolymer having (1) a melt flow rate (MFR) within a range of 1 to 10 g/10 min as determined at 230° C. under a load of 2.16 kg in accordance with ASTM D1238, (2) an isotactic pentad fraction (mmmm fraction) of not less than 94% as determined using $^{13}$C-NMR, (3) an ash amount of not more than 30 ppm as obtained by completely burning the propylene homopolymer in air, and (4) a chlorine amount of not more than 10 ppm as determined by ion chromatography.

A method for producing a polypropylene for a film capacitor of the present invention comprises irradiating a propylene homopolymer with a radiation with an absorbed dose of 0.1 to 500 kGy, the propylene homopolymer having (1) a melt flow rate (MFR) within a range of 1 to 10 g/10 min as determined at 230° C. under a load of 2.16 kg in accordance with ASTM D1238, (2) an isotactic pentad fraction (mmmm fraction) of not less than 94% as determined using $^{13}$C-NMR, (3) an ash amount of not more than 30 ppm as obtained by completely burning the propylene homopolymer in air, and (4) a chlorine amount of not more than 10 ppm as determined by ion chromatography.

A method for producing a polypropylene sheet for a film capacitor of the present invention comprises irradiating a sheet obtained from a propylene homopolymer with a radiation with an absorbed dose of 0.1 to 500 kGy, the propylene homopolymer having (1) a melt flow rate (MFR) within a range of 1 to 10 g/10 min as determined at 230° C. under a load of 2.16 kg in accordance with ASTM D1238, (2) an isotactic pentad fraction (mmmm fraction) of not less than 94% as determined using $^{13}$C-NMR, (3) an ash amount of not more than 30 ppm as obtained by completely burning the propylene homopolymer in air, and (4) a chlorine amount of not more than 10 ppm as determined by ion chromatography.

A method for producing a polypropylene film for a film capacitor of the present invention comprises a step (I) for producing a propylene homopolymer having (1) a melt flow rate (MFR) within a range of 1 to 10 g/10 min as determined at 230° C. under a load of 2.16 kg in accordance with ASTM D1238, (2) an isotactic pentad fraction (mmmm fraction) of not less than 94% as determined using $^{13}$C-NMR, (3) an ash amount of not more than 30 ppm as obtained by completely burning the propylene homopolymer in air, and (4) a chlorine amount of not more than 10 ppm as determined by ion chromatography; a step (II) for producing a sheet from the propylene homopolymer; and a step (III) for producing a stretched film from the sheet, the method comprising the step for irradiating the propylene homopolymer obtained in the step (I) or the sheet obtained in the step (II) with an electron ray with an absorbed dose of 0.1 to 500 kGy.

In a preferable embodiment, the radiation is an electron ray or a gamma ray.

In a preferable embodiment, a cross-linking agent is added to the propylene homopolymer, which is optionally followed by kneading, in order to cross-link the propylene homopolymer. Thereby, a polypropylene film for a film capacitor having higher breakdown voltage is obtained.

In a preferable embodiment, 0.01 to 10% by weight of the cross-linking agent is added to 100% by weight of the propylene homopolymer.

In a preferable embodiment, the absorbed dose of the irradiation is 1 to 300 KGy.

In a preferable embodiment, the propylene homopolymer is in any form of powders, granules and pellets.

In a preferable embodiment, the polypropylene sheet for a film capacitor of the present invention is obtained from the polypropylene for a film capacitor.

A polypropylene film for a film capacitor of the present invention is obtained by biaxially stretching the polypropylene sheet for a film capacitor.

The film capacitor of the present invention comprises the polypropylene film for a film capacitor.

Effect of the Invention

The polypropylene film for a film capacitor obtained from the polypropylene for a film capacitor or the polypropylene sheet for a film capacitor of the present invention, has small thermal shrinkage ratio and high breakdown voltage and can be thin due to excellent stretchability, and therefore can provide a small-sized capacitor with large capacity, which can greatly contribute, for example, to allowing hybrid automobiles to have higher output, smaller size and lighter weight.

EMBODIMENTS FOR CARRYING OUT THE INVENTION

Hereinafter, the present invention will be described in detail.

[Propylene Homopolymer]

A propylene homopolymer, which is a material for the polypropylene for a film capacitor or the polypropylene sheet for a film capacitor of the present invention, satisfies the following requirements (1) to (4). In a more preferred embodiment, the propylene homopolymer satisfies the following requirements (1) to (6), in which case the moldability is good and the breakdown strength is improved.

(1) The melt flow rate (MFR) is within a range of 1 to 10 g/10 min, preferably 2 to 5 g/10 min, as determined at 230° C. under a load of 2.16 kg in accordance with ASTM D1238. The MFR of less than 1 g/10 min may make the film-moldability inferior and make stretching uneasy, and the MFR of more than 10 g/10 min may cause the film to break in stretching, which is thus not preferred. This is presumably due to insufficient melt tension.

(2) The isotactic pentad fraction (mmmm fraction) is not less than 94%, preferably not less than 96%, more preferably not less than 98%, as determined using $^{13}$C-NMR. The polypropylene homopolymer with an isotactic pentad fraction (mmmm fraction) of less than 94%, even if irradiated with a radiation, cannot provide a polypropylene film for a film capacitor having high breakdown voltage and a film capacitor comprising the film. This is presumed to be because the polypropylene homopolymer with a low isotactic pentad fraction has a large number of amorphous portions, which easily conduct electricity. The upper limit of the isotactic pentad fraction, although not particularly limited, is usually not more than 99.5%.

The isotactic pentad fraction (mmmm fraction), a value defined on the basis of assignment shown in Macromolecules, 8, 687 (1975) by A. zambelli et al., indicates the ratio of isotactic chains in a pentad unit in the molecular chain, measured using $^{13}$C-NMR, and calculated as follows: the isotactic pentad fraction=(the area of peaks at 21.7 ppm)/(the area of peaks at 19 to 23 ppm).

(3) The ash amount is not more than 30 ppm, preferably not more than 25 ppm, more preferably not more than 20 ppm, as obtained by completely burning the propylene homopolymer in air. The propylene homopolymer that will have an ash amount of more than 30 ppm cannot provide a polypropylene film for a film capacitor having high breakdown voltage. This is presumably because the propylene homopolymer that will have a large ash amount tends to generate voids, which influences the breakdown strength.

(4) The chlorine amount is not more than 10 ppm, preferably not more than 5 ppm, more preferably not more than 2 ppm, as determined by ion chromatography. The propylene homopolymer having a chlorine amount of more than 10 ppm cannot provide a polypropylene film for a film capacitor having high breakdown voltage. This is presumably because the chlorine, which is converted to hydrochloric acid, gradually breaks the polypropylene, which influences the breakdown strength when the polypropylene film for a film capacitor is used for a long term.

The propylene homopolymers with less ash amount and less chlorine amount in impurities are presumed to have less influence on the breakdown strength.

(5) The melting point (Tm) is not lower than 155° C., preferably not lower than 160° C., more preferably not lower than 163° C., as measured by Differential Scanning calorimetry (DSC). The upper limit of the Tm, although not particularly limited, is usually not more than 170° C. The propylene homopolymer with Tm falling within the above range provides the polypropylene film for a film capacitor excellent in properties such as heat resistance shrinkage and breakdown strength, presumably because of having a small number of amorphous portions which can move freely.

(6) The molecular weight distribution Mw/Mn (Mw: weight-average molecular weight, Mn: number-average molecular weight) is not less than 4.0, preferably 4.5 to 9.0, more preferably 4.5 to 7.5, as measured by gel permeation chromatography (GPC) method. If the molecular weight distribution Mw/Mn is within the above range, the film moldability and stretchability are excellent, which is thus preferable.

[Method for Producing Propylene Homopolymer]

The propylene homopolymer according to the present invention can be produced by a propylene polymerization method using a known propylene polymerization catalyst. In particular, a production method using a supported titanium catalyst is preferable.

As the supported titanium catalyst, preferably used is, for example, a polymerization catalyst comprising a solid titanium catalyst component including titanium, magnesium, a halogen and an internally added electron donating compound; an organometallic compound containing a metal selected from the metals belonging to Group I, Group II and Group III of the periodic table; and an externally added electron donating compound.

As the polymerization catalyst, more specifically, a catalyst used to industrially produce propylene-based polymers including polypropylene is used. Examples thereof include a catalyst comprising a component obtained by supporting titanium trichloride or titanium tetrachloride on a carrier such as a halogenated magnesium, and an organoaluminum compound. Particularly preferred is a catalyst showing high activity and originally having less content of a titanium component.

Because the propylene homopolymer according to the present invention is used for a film capacitor, if the amount of the polymer generated per unit amount of a catalyst is small, it is necessary to carry out a post-treatment for removing catalyst residues. Further, even if high activity of a catalyst results in the generation of a large amount of the polymer, it is preferable to carry out the post-treatment for removing catalyst residues. As the post-treatment, for example, the propylene homopolymer obtained through polymerization is washed with liquid propylene, butane, hexane, heptane, or the like. This procedure may involve the addition of water, an alcohol compound, a ketone compound, an ether compound, an ester compound, an amine compound, an organic acid compound, an inorganic acid compound or the like, in order to solubilize the catalyst components such as titanium and magnesium to thereby facilitate the extraction of the catalyst components. Further, the washing with a polar compound such as water or an alcohol is also preferable.

Moreover, the propylene homopolymer obtained through the above polymerization is preferably subjected to dehalogenation treatment. In particular, the dehalogenation treatment using an epoxy compound is preferable. Here, preferable examples of the epoxy compound include an alkoxyoxide such as ethylene oxide, propylene oxide, butene oxide and cyclohexene oxide, glycidyl alcohol, glycidic acid, and glycidyl ester. Subjecting the propylene homopolymer to dechlorination treatment using these epoxy compounds is extremely effective if involving the use of a compound with a hydroxyl group (OH group) in a mole amount equivalent to or more than the mole amount of the epoxy compound. Here, examples of the compound with the OH group include water and an alcohol.

The propylene homopolymer according to the present invention can be produced also through a multi-stage polymerization in the presence of a high stereoregularity propylene polymerization catalyst. Specifically, the propylene homopolymer used in the present invention can be produced by subjecting the propylene homopolymer to a multi-stage, i.e., two or more stage, polymerization, in which propylene is polymerized substantially in the presence of or in the absence of hydrogen. The production of the propylene homopolymer may involve carrying out prepolymerization beforehand. Polymerization conditions are appropriately selected such that the polymerization temperature is approximately −50 to +200° C., preferably approximately 20 to 100° C. and the polymerization pressure is from normal pressure to 9.8 MPa (gauge pressure), preferably approximately 0.2 to 4.9 MPa (gauge pressure). As a polymerization medium, inert hydrocarbons may be used. As the polymerization medium, liquid propylene may be used. A method for modifying the molecular weight is not particularly limited, but a method using hydrogen as a molecular weight modifier is preferable.

[Form of Propylene Homopolymer]

The propylene homopolymer according to the present invention may be in any form of powders, granules and pellets. The powders and granules are obtained from the propylene homopolymer, and the pellets are obtained by pelletizing the powders or the granules.

The sheet according to the present invention is obtained by a known process, for example, by melt extrusion molding or press molding the powders, granules or pellets.

(Powders, Granules or Pellets)

Where the propylene homopolymer according to the present invention is in the form of powders, granules or pellets, the propylene homopolymer being in the form of powders usually has an average particle diameter, although not limited particularly, of approximately 50 to 150 μm, for example. The propylene homopolymer being in the form of granules usually has an average particle diameter, although not limited particularly, of approximately 150 to 2000 μm, for example. The propylene homopolymer being the form of pellets usually has an average particle diameter and a height, although not being limited particularly, of approximately 2 to 10 mm, and 1 to 5 mm, respectively.

(Sheet)

The thickness of the sheet according to the present invention is not particularly limited, but is usually preferably approximately 80 to 800 μm, more preferably 120 to 500 μm. The sheet with a thickness of less than 80 μm may be broken in stretching, and the sheet with a thickness of more than 800 μm cannot become a thin film, which may be unsuitable for a film capacitor.

[Polypropylene for Film Capacitor or Polypropylene Sheet for Film Capacitor]

The polypropylene for a film capacitor according to the present invention is obtained by irradiating the propylene homopolymer with a radiation, preferably an electron ray or a gamma ray, more preferably an electron ray, with an absorbed dose of 0.1 to 500 kGy, preferably 1 to 300 kGy, more preferably 1 to 100 kGy. The irradiation with an absorbed dose of less than 0.1 kGy cannot achieve the benefit of the irradiation, which prevents the provision of a polypropylene for a film capacitor having excellent stretchability when stretched into a film, and the provision of a polypropylene film for a film capacitor having high breakdown voltage and a film capacitor comprising the film. The irradiation with an absorbed dose of more than 500 kGy deteriorates the propylene homopolymer and deprives the propylene homopolymer of stretchability, and further involves the need to increase irradiation output, which is not preferable in terms of productivity and economical viewpoint. Examples of the radiation include α-ray, β-ray, γ-ray, X-ray, an electron ray, and a positron ray. An electron ray or a gamma ray is preferable, and an electron ray is more preferable. Examples of irradiation sources for the gamma ray include $^{60}$Co and $^{137}$Cs.

The absorbed dose (kGy) of the electron ray is a value calculated as the product of accelerating voltage and electric current of an electron ray irradiator and irradiation time. The absorbed dose (kGy) of the gamma ray can be measured with an alanine dosimeter, a PMMA (Polymethylmethacrylate) dosimeter, and the like, with specific examples thereof including Harwell Red 4034 Perspex Dosimeter. The absorbed dose of the radiation is defined as a total amount of the absorbed dose, and the total amount of the absorbed dose may be the result of a one-time irradiation or plural-time irradiations. The total amount of the absorbed dose may be the result of using plural kinds of rays, but preferable is the irradiation using the electron ray alone. The irradiation conditions of the radiation are not particularly limited as long as the irradiation provides a predetermined absorbed dose.

The polypropylene for a film capacitor according to the present invention can be obtained by irradiating the powders, granules, or pellets, as the propylene homopolymer according to the present invention, with a radiation, preferably an electron ray or a gamma ray, more preferably an electron ray, with an absorbed dose of 0.1 to 500 kGy, preferably 1 to 100 kGy in view of the improvement in the breakdown strength and resin deterioration caused by the irradiation.

When the powders, granules or pellets are irradiated with a radiation, it is preferable that the powders, granules or pellets are laid and arranged uniformly so as not to be superposed among one another. Any sides of the pellets may be irradiated with the radiation, and thus one surface alone, both surfaces, or surfaces including side surfaces of the pellets may be irradiated.

The propylene homopolymer sheet for a film capacitor according to the present invention is obtained by irradiating a sheet obtained from the propylene homopolymer according to the present invention with a radiation, preferably an electron ray or a gamma ray, more preferably an electron ray, with an absorbed dose of 0.1 to 500 kGy, preferably 1 to 300 kGy, more preferably 1 to 100 kGy. The upper limit and lower limit of the absorbed dose of the radiation are defined for the same reasons as described above. Either side of the sheet according to the present invention may be irradiated with a radiation, and thus one side alone or both sides of the sheet may be irradiated. The sheet is preferable as a form, in terms of productivity and economical viewpoint, because the sheet can be irradiated more uniformly with a radiation at a lower output voltage and can provide a polypropylene film for a film capacitor having uniform (even) breakdown strength.

In the present invention, the irradiation of the propylene homopolymer or the sheet obtained from the propylene homopolymer according to the present invention with a radiation, preferably an electron ray, with a desired absorbed dose, leads to the cross-linking of the molecules within amorphous portions in the propylene homopolymer or in the sheet. This results in the increased entanglement between the molecules, which makes the molecules less mobile, and thus blocks the passage of electrons. This is presumably the reason for significant increase in the breakdown voltage of the resulting polypropylene film for a film capacitor. Furthermore, the irradiation with a radiation, preferably electron ray irradiation, not just achieves the cross-linking but also severs parts of the molecules within the amorphous portions. This results in the increased fluidity in stretching, which prompts stretching orientation after the disintegration of spherulites. This is presumably the reason for the improved stretchability of the polypropylene film for a film capacitor.

[Cross-Linking Agent]

In a preferable embodiment, a cross-linking agent is added to the propylene homopolymer, and optionally the mixture is kneaded, before the propylene homopolymer is irradiated with a radiation, preferably an electron ray or a gamma ray, more preferably an electron ray, to thereby produce the polypropylene for a film capacitor or the polypropylene sheet for a film capacitor of the present invention. By cross-linking the propylene homopolymer, a polypropylene film for a film capacitor having higher breakdown voltage can be obtained. This is presumably because the cross-linking using the cross-linking agent reduces the severing of the molecules of the propylene homopolymer, which enables the absorbed dose to be increased to a range where the benefit of the breakdown voltage is more exhibited. For example, when the form is powders, granules or pellets, the absorbed dose can be 0.1 to 500 kGy, preferably 10 to 300 kGy, and when the form is a sheet, the absorbed dose can be 0.1 to 500 kGy, preferably 10 to 300 kGy.

The addition amount of the cross-linking agent is not particularly limited, but is 0.01 to 10% by weight, preferably 0.5 to 5% by weight based on 100% by weight of the propylene homopolymer. The addition of the cross-linking agent in an amount of less than 0.01% by weight may not achieve much effect resulting from the addition of the cross-linking agent. The addition of the cross-linking agent in an amount of more than 10% by weight may make it difficult to mold the propylene homopolymer containing the cross-linking agent.

The cross-linking agent is preferably a cross-linkable monomer having two or more polymerizable double bonds.

Example of such cross-linkable monomers include diacrylate compounds such as polyethylene glycol diacrylate, triethylene glycol diacrylate, 1,3-butylene glycol diacrylate, 1,6-butylene glycol diacrylate, 1,4-butane diol diacrylate, 1,6-hexane diol diacrylate, 1,6-hexane glycol diacrylate, neopentyl glycol diacrylate, 1,9-nonane diol diacrylate, polypropylene glycol diacrylate, 2,2'-bis(4-acryloxypropyloxyphenyl)propane, 2,2'-bis(4-acryloxydiethoxyphenyl)propane; triacrylate compounds such as trimethylol propane triacrylate, trimethylol ethane triacrylate, and tetramethylol methane triacrylate; tetraacrylate compounds such as ditrimethylol tetraacrylate, tetramethylol methane tetraacrylate, and pentaerythritol tetraacrylate; hexaacrylate compounds such as dipentaerythritol hexaacrylate; dimethacrylate compounds such as ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexane diol dimethacrylate, neopentyl glycol dimethacrylate, dipropylene glycol dimethacrylate, polypropylene glycol dimethacrylate, polybutylene glycol dimethacrylate, and 2,2'-bis(4-methacryloxydiethoxyphenyl)propane; trimethacrylate compounds such as trimethylol propane trimethacrylate, and trimethylol ethane trimethacrylate; glycerin-α-allyl ether; triallyl isocyanurate; trimethallyl isocyanurate; methylenebisacrylamide; and divinyl benzene.

Of these, 1,3-butylene glycol dimethacrylate, 1,3-butylene glycol diacrylate, 1,4-butane diol diacrylate, polyethylene glycol diacrylate, 1,6-hexane glycol diacrylate, glycerin-α-allyl ether, trimethylol propane trimethacrylate, trimethylol propane triacrylate, triallyl isocyanurate, trimethallyl isocyanurate, and tetramethylol methane tetraacrylate are preferable. In view of easy handling characteristics due to moderate reaction and less volatility in molding, triallyl isocyanurate is more preferable.

[Other Additives]

The propylene homopolymer, which is a material for the polypropylene for a film capacitor or the polypropylene sheet for a film capacitor of the present invention, may be obtained after adding additives such as weathering stabilizers, heat stabilizers, antistatic agents, anti-slip agents, anti-blocking agents, anti-fogging agents, nucleating agents, lubricating agents, pigments, dyes, plasticizers, anti-aging agents, hydrochloric acid absorbents and antioxidants, as long as the object of the present invention is not impaired.

[Polypropylene Film for Film Capacitor and Film Capacitor]

A polypropylene film for a film capacitor of the present invention is obtained by stretching the polypropylene for a film capacitor or the polypropylene sheet for a film capacitor of the present invention, and has high breakdown voltage and small thermal shrinkage ratio. The polypropylene for a film capacitor or the polypropylene sheet for a film capacitor of the present invention exhibits excellent stretchability, and thus can provide a polypropylene film for a film capacitor which is a thin film.

As described above, the polypropylene sheet for a film capacitor of the present invention has been uniformly irradiated with a radiation, preferably an electron ray or a gamma ray, more preferably an electron ray. As a result, a polypropylene film for a film capacitor having uniform (even) breakdown strength can be obtained. This is preferable also in terms of productivity and economical viewpoint.

Compared with a conventional polypropylene film, the polypropylene film for a film capacitor of the present invention has high breakdown voltage and excellent stretchability, and therefore can show its performance sufficient for the use in a small-sized capacitor with large capacity, which can greatly contribute, for example, to allowing hybrid automobiles to have higher output and lighter weight.

The thermal shrinkage ratio (%) of the polypropylene film for a film capacitor of the present invention is −2.0% to +2.0%, preferably −1.5 to +1.5%. The thermal shrinkage ratio is defined as the ratio of a shrunk length to an original length, obtained when the polypropylene film for a film capacitor of the present invention is cut into 10 mm in width and 100 mm in length in the direction of the flow of the resin (MD direction), and the cut film is put into a 120° C. hot-air oven and heated for 15 minutes. The thermal shrinkage ratio lower than the above range makes the winding tightness insufficient, which may make the form-retention difficult or may cause voids leading to the deterioration of the elements. The thermal shrinkage ratio higher than the above range may lead to the deformation of the elements or occurrence of voids due to the deformation, which may deteriorate or break the elements.

The thickness of the polypropylene film according to the present invention is preferably 1 to 20 μm, preferably 1 to 15 μm, more preferably 2 to 8 μm, particularly preferably 2 to 4 μm. A polypropylene film having a thickness within the above range (preferably, not more than 8 μm, particularly preferably not more than 4 μm), compared with when using a previously known material, exhibits superior electric characteristics (breakdown voltage). A film having a thickness less than the above range may be difficult to mold by current technique, and the use of a film having a thickness exceeding the above range increases the size of a film capacitor, and the current call for smaller sized capacitor may not be satisfied.

The polypropylene film for a film capacitor of the present invention can be obtained by melt-extruding, at 180 to 280° C., the polypropylene for a film capacitor of the present invention, optionally concurrently adding thereto various additives such as various antioxidants including Irganox 1010, BHT (dibutylhydroxytoluene) and Irgafos 168, and calcium stearate, and then subjecting an original sheet obtained, for example, to monoaxial stretching where an original sheet obtained is stretched at 100 to 160° C. at a stretching ratio of 2 to 10 times in the machine direction, i.e., the direction parallel to the flow of the resin extruded when the original sheet is prepared; or to biaxial stretching where a film obtained through the monoaxial stretching is subjected to successive stretching under similar conditions to those in the monoaxial stretching in the direction perpendicular to the machine direction; or to simultaneous biaxial stretching where the sheet is stretched in the machine direction and in the direction perpendicular to the machine direction at the same time. Alternatively, the polypropylene film for a film capacitor of the present invention can be obtained by melt-extruding, at 180 to 280° C., the polypropylene homopolymer for a film capacitor of the present invention, optionally concurrently adding thereto various additives such as various antioxidants including Irganox 1010, BHT (dibutylhydroxytoluene) and Irgafos 168, and calcium stearate, and then irradiating an original sheet obtained with an radiation with a desired absorbed dose thereby providing a polypropylene sheet for a film capacitor, and subsequently, subjecting the sheet to the monoaxial stretching or biaxial stretching as described above. In the sheet molding or pelletizing, nitrogen sealing is preferably carried out.

At an industrial scale, the polypropylene film for a film capacitor can be obtained by various known simultaneous biaxial stretching or successive biaxial stretching methods, for example, tubular film method, and tenter method.

In the tenter method, a melt sheet melt-extruded from a T-die is solidified at a cooling roll, and the sheet is preheated as needed, and introduced into a stretching zone, and then, stretched at 100 to 160° C. at a stretching ratio of 3 to 7 times in the longitudinal direction and at a stretching ratio of 5 to 11 times in the transversal direction. The total area stretching ratio is 20 to 70 times, preferably 30 to 50 times. If the total area stretching ratio is lower than 20 times, the film does not have a large strength. If the total area stretching ratio exceeds 70 times, the film tends to have voids, have lowered strength in the width direction and tear in the longitudinal direction. As needed, finally, the biaxially stretched film is heat-set at 160 to 190° C.

In the present invention, the polypropylene film for a film capacitor as descried above can be used in a known film capacitor. The polypropylene film for a film capacitor of the present invention, even though being a thin film, exhibits high breakdown voltage, and allows even a small-sized capacitor to have high capacitor capacity.

EXAMPLES

Hereinafter, the present invention will be described with reference to Examples, but the present invention is in no way limited by these Examples.

In Examples and Comparative Examples, various properties were measured as follows.

(1) Melt Flow Rate (MFR)

The MFR of a specimen (propylene homopolymer) was measured at 230° C. under a load of 2.16 kg in accordance with ASTM D1238.

(2) Isotactic Pentad Fraction (mmmm fraction)

The isotactic pentad fraction (mmmm fraction) of a specimen (propylene homopolymer) was measured based on the assignment shown in Macromolecules, 8, 687 (1975) by A. zambelli et al., using $^{13}$C-NMR under the following conditions, to obtain a meso pentad fraction=(an area of peaks at 21.77 ppm)/(an area of peaks at 19 to 23 ppm).

<Measurement Conditions>
Type: JNM-Lambada400 (manufactured by JOEL Ltd.)
Decomposition Capacity: 400 MHz
Measurement Temperature: 125° C.
Solvent: 1,2,4-trichlorobenzene/deuterated benzene=7/4
Pulse Width: 7.8 µsec.
Pulse Interval: 5 sec.
Number of Integration: 2000
Shift Standard: TMS=0 ppm
Mode: single pulse broadband decoupling (3) Ash Amount 100 g of a specimen (propylene homopolymer) was put into a porcelain crucible, which was heated and burnt on an electric heater, and introduced into an electric furnace at 750° C. for 30 minutes, thereby completely changing the specimen into ash. The crucible was cooled in a desiccator for one hour. Then, the weight of the ash amount was measured to the unit of 0.1 mg with a precision scale, and the ash amount (ppm) relative to the specimen was calculated.

(4) Chlorine Amount

Approximately 0.7 g of a specimen (propylene homopolymer) was set in a specimen-burning device (QF-02 manufactured by Mitsubishi Chemical Corporation), and allowed to slowly burn under conditions permitting the specimen to be completely burnt. Then, combustion gas generated was passed through absorbing liquid (ultra pure water) in order to capture chlorine. The absorbing liquid was introduced into an ion chromatograph equipped with a concentration device (DX-300 manufactured by Nippon Dionex K.K.). From an area of a chromatogram obtained, the chlorine amount was calculated. The detection limit was 1 ppm.

(5) Melting Point (Tm)

Approximately 0.40 g of a specimen (propylene homopolymer) was put into a mold for forming a film with a thickness of 0.2 mm, heated at 240° C. for seven minutes, and cool-pressed, thereby preparing a film. From a film obtained, a film in an amount of 5.0 mg±0.5 mg was cut out, and crimped with an exclusively-used aluminum pan, thereby proving a measurement sample. The melting point (Tm) was obtained from an endothermic curve prepared when by the use of DSC 7 manufactured by PerkinElmer Co., Ltd., the sample was held under nitrogen stream at 30° C. for 0.5 minute, heated at a rate of 30° C./10 min from 30° C. to 240° C., held at 240° C. for 10 minutes, cooled at a rate of 10° C./min from 240° C. to 30° C., held at 30° C. for 2 minutes, and then heated at a rate of 10° C./min.

(6) Molecular Weight Distribution (Mw/Mn)

The molecular weight distribution (Mw/Mn) was measured as follows by the use of Gel Permeation Chromatograph Alliance GPC-2000 manufactured by Waters. Separation columns used were two columns of TSKgel GNH6-HT and two columns of TSKgel GNH6-HTL. The size for these columns was 7.5 mm in diameter, and 300 mm in length. The column temperature was 140° C. A mobile phase used was o-dichlorobenzene using 0.025% by weight of BHT as antioxidant, which was moved at 1.0 mL/minute. The concentration of a specimen (propylene homopolymer) was 15 mg/10 mL. The amount of feeding the specimen was 500 µL. A detector used was a differential refractometer. Regarding standard polystyrenes, the polystyrene manufactured by Tosoh Corporation having a molecular weight within the range of Mw<1000 and Mw>4×10$^6$, and the polystyrene manufactured by Pressure Chemical Company having a molecular weight within the range of 1000≤Mw≤4×10$^6$ were used.

(7) Thermal Shrinkage

A biaxially stretched film was cut into 10 mm in width and 100 mm in length in MD direction. The cut film was put into a 120° C. hot-air oven and heated for 15 minutes. The ratio of a length shrunk to an original length was calculated as the thermal shrinkage ratio (o).

(8) Breakdown Voltage (BDV)

In accordance with JIS C2330, voltage was applied to a biaxially stretched film (250 mm×300 mm, 15 µm in thickness) by the use of a six-point direct-current alternate-current converting type 15 KV pressure resistant tester manufactured by Kasuga Electric Works, Ltd, at a temperature of 80° C., at a voltage increase of 100 to 500 V/sec, thereby measuring the breakdown voltage and thus obtaining the pressure resistant property. The upper electrode was a brass-made column having a mass of 500 g and a diameter of 25 mm, which was provided as a positive electrode, and the lower electrode was a silicon rubber wrapped with an aluminum foil stipulated in JIS-H-4160, which was provided as a negative electrode. A single piece of the film was measured using the six points, and three pieces of the sheets were measured, and an average value thereof was defined as a BDV value.

The breakdown voltage is obtained by dividing a measured value (V) of the breakdown strength by a thickness (µm) of the film.

(9) Stretchability

A press sheet or a T-die sheet was subjected to successive biaxial stretching using a biaxial stretcher (KARO IV manufactured by BRUECKNER), under the conditions of a preheating temperature of 152° C., a preheating time of 60 seconds, a stretching temperature of 152° C., a stretching ratio 5×7 times (5 times in the direction of the flow of the resin (MD direction), 7 times in the direction perpendicular to the direction of the flow of the resin (TD direction)), and a stretching speed of 6 m/min. Under the same conditions, five pieces of the biaxially stretched films were prepared, and the stretchability was evaluated in the following way.

AA: Out of five pieces, five pieces were stretched well.
BB: Out of five pieces, one or more pieces were poorly stretched, having necking, breaking or the like.
CC: Out of five pieces, five pieces were poorly stretched, having necking, breaking or the like.

Here, the necking means that the stretched film includes an unstretched part therein.

[Production Example of Propylene Homopolymer]
(1) Preparation of Solid Titanium Catalyst Component 952 g of anhydrous magnesium chloride, 4420 mL of decane, and 3906 g of 2-ethylhexylalcohol were heated at 130° C. for 2 hours, thereby to provide a homogenous solution. Into the solution, 213 g of phthalic anhydride was added, which was followed by further stirring and mixing at 130° C. for 1 hour so as to dissolve the phthalic anhydride. A homogenous solution obtained was cooled to 23° C., and 750 mL of this homogenous solution was added dropwise over 1 hour into 2000 mL of titanium tetrachloride held at −20° C. After the dropwise addition, the temperature of a mixture solution obtained was raised to 110° C. over 4 hours. When the temperature reached 110° C., 52.2 g of diisobutyl phthalate (DIBP) was added, and at the temperature, heating was carried out for 2 hours. Then, a solid part was collected by heated filtration, and this solid part was resuspended in 2750 mL of titanium tetrachloride. The suspension was washed using 110° C. decane and hexane until the titanium compound became undetectable in the washing liquid. A solid titanium catalyst component thus prepared was stored as a hexane slurry. A part of the hexane slurry was dried to study the catalyst composition, and it was found that the solid titanium catalyst component had 2% by weight of titanium, 57% by weight of chlorine, 21% by weight of magnesium, and 20% by weight of DIBP.

(2) Preparation of Prepolymerization Catalyst 120 g of a transition metal catalyst component, 20.5 mL of triethylaluminum, and 120 L of heptane were charged into a 200 L autoclave equipped with a stirrer. With the temperature inside the autoclave kept at 5° C., 720 g of propylene was added thereto. Then, with stirring carried out for 60 minutes, the reaction was allowed to proceed. After the polymerization, a solid component was allowed to settle, a supernatant liquid was removed, and the residue was washed two times using heptane. A prepolymerization catalyst obtained was resuspended in a purified heptane in order for the transition metal catalyst component concentration to be 1 g/L. This prepolymerization catalyst contained 6 g of a propylene polymer per 1 g of the transition metal catalyst component.

(3) Polymerization

Into a 100 L vessel polymerization reactor equipped with a stirrer, 110 kg/h of propylene, 1.4 g/h of the catalyst slurry produced in (2) as a transition metal catalyst component, 5.8 mL/h dicyclopentyldimethoxysilane were continuously fed, and hydrogen was fed so that the hydrogen concentration in the gas phase part became 0.9 mol %. Polymerization was carried out at a polymerization temperature of 73° C., and a pressure of 3.2 MPa/G. A slurry obtained was transferred into a 1000 L vessel polymerization reactor equipped with a stirrer, where further polymerization was carried out. 30 kg/h of propylene, and hydrogen such that the hydrogen concentration in the gas phase part became 1.3 mol %, were fed into the polymerizer, and then polymerization was carried out at a polymerization temperature of 71° C., and a pressure of 3.0 MPa/G. A slurry obtained was transferred to a 500 L vessel equipped with a stirrer, where further polymerization was carried out. 46 kg/h of propylene, and hydrogen such that the hydrogen concentration in the gas phase part became 1.3 mol %, were fed into the polymerizer, and then polymerization was carried out at a polymerization temperature of 69° C., and a pressure of 2.9 MPa/G. A slurry obtained was deactivated, and then, the slurry was transferred to a washing tank using liquid propylene where the propylene homopolymer powders were washed. This slurry was subjected to vaporization, and subjected to gas-solid separation, thereby obtaining a propylene homopolymer. The propylene homopolymer obtained was introduced into a conical drier, where vacuum drying was carried out at 80° C. Then, to 100 kg of this product, 35.9 g of pure water, and 0.63 L of propylene oxide were added, which was followed by dechlorination treatment at 90° C. for 2 hours and then vacuum drying at 80° C., thereby obtaining propylene homopolymer powders.

Example 1

Pellets (average particle diameter: 3 mm) of the propylene homopolymer obtained in the above Production Example (MFR: 4.2 g/10 min, mmmm: 98%, ash amount: 20 ppm, chlorine amount: 1 ppm, Tm: 166° C., Mw/Mn: 6.5) were laid and arranged uniformly such that pellets were not superposed among one another, and were irradiated with an electron ray with an absorbed dose of 1 kGy (accelerating voltage: 800 kV, electric current: 0.5 mA, irradiation rate: 2 m/min) by the use of an electron ray irradiator (EBC800-35 manufactured by NHV Corporation).

The pellets irradiated were pressed by the use of a press molding machine (SFA-20 manufactured by Shinto Metal Industries Corporation) under the conditions of a preheating/heating temperature of 210° C., a preheating time of 5 minutes, a heating pressure of 10 MPa, a pressurizing and heating time of 2 minutes, thereby obtaining a 0.5 mm pressed sheet.

This pressed sheet was cut into 85 mm×85 mm and the sheet was subjected to successive biaxial stretching using a biaxial stretcher (KARO IV manufactured by BRUECKNER), under the conditions of a preheating temperature of 152° C., a preheating time of 60 seconds, a stretching temperature of 152° C., a stretching ratio 5×7 times (5 times in MD direction, 7 times in TD direction), and a stretching speed of 6 m/min, thereby obtaining a biaxially stretched film with a thickness of 15 μm.

The result of a film obtained is set forth in Table 1.

Examples 2 and 3

In Example 2, a film was prepared in the same manner as in Example 1, except that the absorbed dose of the electron ray was 10 kGy (accelerating voltage: 800 kV, electric current: 1.3 mA, irradiation rate: 2 m/min).

In Example 3, a film was prepared in the same manner as in Example 1, except that the absorbed dose of the electron ray was 100 kGy (two-time irradiations, 50 kGy (accelerating voltage 800 kV, electric current: 4.9 mA, irradiation rate: 2 m/min) for each irradiation).

The results of films obtained are set forth in Table 1.

Comparative Example 1

A film was prepared in the same manner as in Example 1, except that the film was not irradiated with the electron ray. The result of a film obtained is set forth in Table 1.

Example 4

Pellets (average particle diameter: 3 mm) of a propylene homopolymer (MFR: 4.2 g/10 min, mmmm: 98%, ash amount: 20 ppm, chlorine amount: 1 ppm, Tm: 166° C., Mw/Mn: 6.5) were melted at a molding temperature of 210° C., using a 30 mm-diameter extruder (an extrusion sheet molding machine manufactured by GM Engineering, Inc.), and then extruded from a T-die, and slowly cooled at a cooling roll held at a cooling temperature of 30° C. under the condition of a take-up speed of 1.0 m/min, thereby obtaining a sheet with a thickness of 0.5 mm.

This sheet was cut into 85 mm×85 mm, and the sheet was irradiated with an electron ray with an absorbed dose of 1 kGy (accelerating voltage: 300 kV, electric current: 1.9 mA, irradiation rate: 50 m/min) by the use of an electron ray irradiator (EBC300-60 manufactured by NHV Corporation).

The sheet irradiated was subjected to successive biaxial stretching using a biaxial stretcher (KARO IV manufactured by BRUECKNER), under the conditions of a preheating temperature of 152° C., a preheating time of 60 seconds, a stretching temperature of 152° C., a stretching ratio 5×7 times (5 times in MD direction, 7 times in TD direction), and a stretching speed of 6 m/min, thereby obtaining a biaxially stretched film with a thickness of 15 μm.

The result of a film obtained is set forth in Table 1.

Examples 5 to 7

In Example 5, a film was prepared in the same manner as in Example 4, except that the absorbed dose of the electron ray was 10 kGy (accelerating voltage: 300 kV, electric current: 18.7 mA, irradiation rate: 50 m/min).

In Example 6, a film was prepared in the same manner as in Example 4, except that the absorbed dose of the electron ray was 100 kGy (accelerating voltage: 300 kV, electric current: 37.4 mA, irradiation rate: 10 m/min).

In Example 7, a film was prepared in the same manner as in Example 4, except that the absorbed dose of the electron ray was 300 kGy (three-time irradiations under the conditions of 100 kGy)

The results of films obtained are set forth in Table 1.

Comparative Example 2

A film was prepared in the same manner as in Example 4, except that the film was not irradiated with the electron ray. The result of a film obtained is set forth in Table 1.

Comparative Example 3

In the same manner as in Example 4, except that the absorbed dose of the electron ray was 1000 kGy (ten-time irradiations under the conditions of 100 kGy), an attempt to prepare a film was made, but a film was not able to be prepared, because the specimen was deteriorated by the irradiation with the electron ray.

Example 8

A film was prepared in the same manner as in Example 5, except that pellets (average particle diameter: 3 mm) of a propylene homopolymer (MFR: 2.9 g/10 min, mmmm: 94%, ash amount: 23 ppm, chlorine amount: 1 ppm, Tm: 163° C., Mw/Mn: 5.0) were used, and the preheating temperature of the biaxial stretcher was 149° C. The result of a film obtained is set forth in Table 1.

Comparative Example 4

A film was prepared in the same manner as in Example 8, except that the film was not irradiated with the electron ray. The result of a film obtained is set forth in Table 1.

Comparative Example 5

A film was prepared in the same manner as in Comparative Example 2, except that pellets (average particle diameter: 3 mm) of a propylene homopolymer (MFR: 2.8 g/10 min, mmmm: 91%, ash amount: 27 ppm, chlorine amount: 3 ppm, Tm: 160° C., Mw/Mn: 8.0) were used, and the preheating temperature of the biaxial stretcher was 145° C. The result of a film obtained is set forth in Table 1.

Comparative Example 6

A film was prepared in the same manner as in Comparative Example 5, except that the absorbed dose of the electron ray was 10 kGy (accelerating voltage: 300 kV, electric current: 18.7 mA, irradiation rate: 50 m/min). The result of a film obtained is set forth in Table 1.

Comparative Example 7

99% by weight of pellets (average particle diameter: 3 mm) of a propylene homopolymer (MFR: 4.2 g/10 min, mmmm: 98%, ash amount: 20 ppm, chlorine amount: 1 ppm, Tm: 166° C., Mw/Mn: 6.5), and 1% by weight of a propylene homopolymer (PF814 (product name) manufactured by Basell, MFR: 3.2 g/10 min, mmmm: 91%, ash amount: 220 ppm, chlorine amount: 24 ppm, Tm: 158° C., Mw/Mn: 8.5) were melt-kneaded at a molding temperature of 210° C. by the use of a biaxial extruder (HYPERKTX30, 30 mm-diameter×2 manufactured by KOBE STEEL, Ltd.), thereby obtaining pellets.

These pellets were melted at a molding temperature of 210° C., using a 30 mm-diameter extruder (an extrusion sheet molding machine manufactured by GM Engineering, Inc.), and then extruded from a T-die, and slowly cooled at a cooling roll held at a cooling temperature of 30° C. under the condition of a take-up speed of 1.0 m/min, thereby obtaining a sheet with a thickness of 0.5 mm.

This sheet was subjected to successive biaxial stretching using a biaxial stretcher (KARO IV manufactured by BRUECKNER), under the conditions of a preheating temperature of 152° C., a preheating time of 60 seconds, a stretching temperature of 152° C., a stretching ratio 5×7 times (5 times in MD direction, 7 times in TD direction), and a stretching speed of 6 m/min, thereby obtaining a biaxially stretched film with a thickness of 15 μm.

The result of a film obtained is set forth in Table 1.

Comparative Example 8

A film was prepared in the same manner as in Comparative Example 2, except that pellets (average particle diameter: 3 mm) of a propylene homopolymer (MFR: 3.0 g/10 min, mmmm: 98.5%, ash amount: 300 ppm, chlorine amount: 70 ppm, Tm: 167° C., Mw/Mn: 6.0) were used. The result of a film obtained is set forth in Table 1.

Comparative Example 9

A film was prepared in the same manner as in Example 1, except that a propylene homopolymer (PF814 (product name) manufactured by Basell, MFR: 3.2 g/10 min, mmmm: 91.0%, ash amount: 220 ppm, chlorine amount: 24 ppm, Tm: 158° C., Mw/Mn: 8.5) was used as pellets. The result of a film obtained is set forth in Table 1.

in MD direction, 7 times in TD direction), and a stretching speed of 6 m/min, thereby obtaining a biaxially stretched film with a thickness of 15 µm.

The result of a film obtained is set forth in Table 2.

TABLE 1

|  | Form Irradiated | MFR g/10 min | mmmm — | Ash Amount ppm | Chlorine Amount ppm | Melting Point ° C. | Mw/Mn — | Electron Ray Absorbed Dose kGy | Thermal Shrinkage Ratio % | BDV V/µm | Stretchability — |
|---|---|---|---|---|---|---|---|---|---|---|---|
| Ex. 1 | pellet | 4.2 | 0.98 | 20 | 1 | 166 | 6.5 | 1 | 1.2 | 642 | AA |
| Ex. 2 | pellet |  |  |  |  |  |  | 10 | 0.9 | 651 | AA |
| Ex. 3 | pellet |  |  |  |  |  |  | 100 | 1.1 | 653 | AA |
| Com. Ex. 1 | — |  |  |  |  |  |  | 0 | 1.1 | 612 | BB |
| Ex. 4 | sheet | 4.2 | 0.98 | 20 | 1 | 166 | 6.5 | 1 | 0.9 | 650 | AA |
| Ex. 5 | sheet |  |  |  |  |  |  | 10 | 0.9 | 698 | AA |
| Ex. 6 | sheet |  |  |  |  |  |  | 100 | 1.0 | 690 | AA |
| Ex. 7 | sheet |  |  |  |  |  |  | 300 | 0.9 | 646 | AA |
| Com. Ex. 2 | — |  |  |  |  |  |  | 0 | 1.1 | 613 | BB |
| Com. Ex. 3 | sheet |  |  |  |  |  |  | 1000 | — | — | CC |
| Ex. 8 | sheet | 2.9 | 0.94 | 23 | 1 | 163 | 5.0 | 10 | 1.6 | 629 | AA |
| Com. Ex. 4 | — |  |  |  |  |  |  | 0 | 1.5 | 602 | AA |
| Com. Ex. 5 | — | 2.8 | 0.91 | 27 | 3 | 160 | 8.0 | 0 | 3.0 | 550 | AA |
| Com. Ex. 6 | sheet |  |  |  |  |  |  | 10 | 2.8 | 572 | AA |
| Com. Ex. 7*[1] | — | 4.2 | 0.98 | 20 | 1 | 166 | 6.5 | 0 | 1.1 | 616 | AA |
|  |  | 3.2 | 0.91 | 220 | 24 | 158 | 8.5 |  |  |  |  |
| Com. Ex. 8 | — | 3.0 | 0.985 | 300 | 70 | 167 | 6.0 | 0 | 1.0 | 583 | BB |
| Com. Ex. 9 | pellet | 3.2 | 0.91 | 220 | 24 | 158 | 8.5 | *[2] | 2.9 | 550 | AA |

*[1]In Com. Ex. 7, a film was prepared from pellets obtained by kneading two kinds of polypropylenes.
*[2]Irradiation amount of the electron ray is unknown.

As shown in Examples and Comparative Examples of the present application, it is found that the polypropylene film for a film capacitor of the present invention has extremely high breakdown voltage.

Example 9

100% by weight of pellets (average particle diameter: 3 mm) of a propylene homopolymer (MFR: 4.2 g/10 min, mmmm: 98%, ash amount: 20 ppm, chlorine amount: 1 ppm, Tm: 166° C., Mw/Mn: 6.5), and 1% by weight of triallylisocyanurate (TRIC manufactured by Nippon Kasei Chemical Co., Ltd.) as a cross-linking agent were melt-kneaded at a molding temperature of 210° C. by the use of a biaxial extruder (HYPERKTX30, 30 mm-diameter×2 manufactured by KOBE STEEL, Ltd.), thereby obtaining pellets.

These pellets were laid and arranged uniformly such that pellets were not superposed among one another, and were irradiated with an electron ray with an absorbed dose of 10 kGy (accelerating voltage: 800 kV, electric current: 1.3 mA, irradiation rate: 2 m/min) by the use of an electron ray irradiator (EBC800-35 manufactured by NHV Corporation).

The pellets irradiated were pressed by the use of a press molding machine (SFA-20 manufactured by Shinto Metal Industries Corporation) under the conditions of a preheating/heating temperature of 210° C., a preheating time of 5 minutes, a heating pressure of 10 MPa, a pressurizing and heating time of 2 minutes, thereby obtaining a 0.5 mm pressed sheet.

This pressed sheet was cut into 85 mm×85 mm and the sheet was subjected to successive biaxial stretching using a biaxial stretcher (KARO IV manufactured by BRUECKNER), under the conditions of a preheating temperature of 152° C., a preheating time of 60 seconds, a stretching temperature of 152° C., a stretching ratio 5×7 times (5 times Example 10

A film was prepared in the same manner as in Example 9, except that the absorbed dose of the electron ray was 50 kGy (accelerating voltage: 800 kV, electric current: 4.9 mA, irradiation rate: 2 m/min). The result of a film obtained is set forth in Table 2.

Comparative Example 10

A film was prepared in the same manner as in Example 9, except that the film was not irradiated with the electron ray. The result of a film obtained is set forth in Table 2.

Example 11

100% by weight of pellets (average particle diameter: 3 mm) of a propylene homopolymer (MFR: 4.2 g/10 min, mmmm: 98%, ash amount: 20 ppm, chlorine amount: 1 ppm, Tm: 166° C., Mw/Mn: 6.5), and 1% by weight of TAIC as a cross-linking agent were melt-kneaded at a molding temperature of 210° C. by the use of a biaxial extruder (HYPERKTX30, 30 mm-diameter×2 manufactured by KOBE STEEL, Ltd.), thereby obtaining pellets.

These pellets were melted at a molding temperature of 210° C., using a 30 mm-diameter extruder (an extrusion sheet molding machine manufactured by GM Engineering, Inc.), and then extruded from a T-die, and slowly cooled at a cooling roll held at a cooling temperature of 30° C. under the condition of a take-up speed of 1.0 m/min, thereby obtaining a sheet with a thickness of 0.5 mm.

This sheet was cut into 85 mm×85 mm, and the sheet was irradiated with an electron ray with an absorbed dose of 1 kGy (accelerating voltage: 300 kV, electric current: 1.9 mA, irradiation rate: 50 m/min) by the use of an electron ray irradiator (EBC300-60 manufactured by NHV Corporation).

The sheet irradiated was subjected to successive biaxial stretching using a biaxial stretcher (KARO IV manufactured by BRUECKNER), under the conditions of a preheating temperature of 152° C., a preheating time of 60 seconds, a stretching temperature of 152° C., a stretching ratio 5×7 times (5 times in MD direction, 7 times in TD direction), and a stretching speed of 6 m/min, thereby obtaining a biaxially stretched film with a thickness of 15 µm.

The result of a film obtained is set forth in Table 2.

Examples 12 and 13

In Example 12, a film was prepared in the same manner as in Example 11, except that the absorbed dose of the electron ray was 10 kGy (accelerating voltage: 300 kV, electric current: 18.7 mA, irradiation rate: 50 m/min).

In Example 13, a film was prepared in the same manner as in Example 11, except that the absorbed dose of the electron ray was 100 kGy (accelerating voltage: 300 kV, electric current: 37.4 mA, irradiation rate: 10 m/min).

The results of films obtained are set forth in Table 2.

Examples 14 to 18

In Example 14, a film was prepared in the same manner as in Example 12, except that 4% by weight of TAIC as a cross-linking agent was used.

In Example 15, a film was prepared in the same manner as in Example 13, except that 4% by weight of TAIC as a cross-linking agent was used.

In Example 16, a film was prepared in the same manner as in Example 12, except that 5% by weight of TAIC as a cross-linking agent was used.

In Example 17, a film was prepared in the same manner as in Example 13, except that 5% by weight of TAIC as a cross-linking agent was used.

In Example 18, a film was prepared in the same manner as in Example 11, except that 5% by weight of TAIC as a cross-linking agent was used, and the absorbed dose of the electron ray was 300 kGy (three-time irradiations under the conditions of 100 kGy described above).

The results of films obtained are set forth in Table 2.

Comparative Example 11

In Comparative Example 11, a film was prepared in the same manner as in Example 11, except that the film was not irradiated with the electron ray. The result of a film obtained is set forth in Table 2.

Comparative Examples 12 to 14

In Comparative Example 12, a film was prepared in the same manner as in Comparative Example 11, except that 4% by weight of TAIC as a cross-linking agent was used.

In Comparative Example 13, a film was prepared in the same manner as in Comparative Example 11, except that 5% by weight of TAIC as a cross-linking agent was used.

In Comparative Example 14, in the same manner as in Example 11, except that 5% by weight of TAIC as a cross-linking agent was used, and the absorbed dose of the electron ray was 1000 kGy (ten-time irradiations under the conditions of 100 kGy), an attempt to prepare a film was made, but a film was not able to be prepared, because the specimen was deteriorated by the irradiation with the electron ray.

The results of films obtained are set forth in Table 2.

Comparative Example 15

In the same manner as in Example 11, except that 15% by weight of TAIC as a cross-linking agent was used, an attempt to prepare a film was made, but a film was not able to be prepared, because the excessive amount of the cross-linking agent prevented the specimen from becoming pelletized.

Example 19

A film was prepared in the same manner as in Example 12, except that pellets (average particle diameter: 3 mm) of a propylene homopolymer (MFR: 2.9 g/10 min, mmmm: 94%, ash amount: 23 ppm, chlorine amount: 1 ppm, Tm: 163° C., Mw/Mn: 5.0) were used, and the preheating temperature of the biaxial stretcher was 149° C. The result of a film obtained is set forth in Table 2.

Comparative Example 16

A film was prepared in the same manner as in Example 19, except that pellets (average particle diameter: 3 mm) of a propylene homopolymer (MFR: 2.8 g/10 min, mmmm: 91%, ash amount: 27 ppm, chlorine amount: 3 ppm, Tm: 160° C., Mw/Mn: 8.0) were used. The result of a film obtained is set forth in Table 2.

TABLE 2

| | Form Irradiated | MFR g/10 min | mmmm — | Ash Amount ppm | Chlorine Amount ppm | Melting Point ° C. | Mw/Mn — | Cross-linking Agent (TAIC) wt % | Electron Ray Absorbed Dose kGy | Thermal Shrinkage Ratio % | BDV V/µm | Stretchability — |
|---|---|---|---|---|---|---|---|---|---|---|---|---|
| Ex. 9 | pellet | 4.2 | 0.98 | 20 | 1 | 166 | 6.5 | 1 | 10 | 1.1 | 688 | AA |
| Ex. 10 | pellet | | | | | | | 1 | 50 | 1.0 | 671 | AA |
| Com. Ex. 10 | — | | | | | | | 1 | 0 | 1.1 | 620 | BB |
| Ex. 11 | sheet | 4.2 | 0.98 | 20 | 1 | 166 | 6.5 | 1 | 1 | 1.1 | 670 | AA |
| Ex. 12 | sheet | | | | | | | 1 | 10 | 1.0 | 729 | AA |
| Ex. 13 | sheet | | | | | | | 1 | 100 | 1.0 | 691 | AA |
| Ex. 14 | sheet | | | | | | | 4 | 10 | 1.1 | 713 | AA |
| Ex. 15 | sheet | | | | | | | 4 | 100 | 1.0 | 707 | AA |
| Ex. 16 | sheet | | | | | | | 5 | 10 | 1.1 | 734 | AA |
| Ex. 17 | sheet | | | | | | | 5 | 100 | 1.1 | 718 | AA |
| Ex. 18 | sheet | | | | | | | 5 | 300 | 1.2 | 685 | AA |
| Com. Ex. 11 | — | | | | | | | 1 | 0 | 1.2 | 615 | BB |
| Com. Ex. 12 | — | | | | | | | 4 | 0 | 1.2 | 610 | BB |
| Com. Ex. 13 | — | | | | | | | 5 | 0 | 1.2 | 619 | BB |
| Com. Ex. 14 | sheet | | | | | | | 5 | 1000 | — | — | CC |
| Com. Ex. 15 | — | | | | | | | 15 | — | — | — | — |

TABLE 2-continued

|  | Form Irradiated | MFR g/10 min | mmmm — | Ash Amount ppm | Chlorine Amount ppm | Melting Point °C. | Mw/Mn — | Cross-linking Agent (TAIC) wt % | Electron Ray Absorbed Dose kGy | Thermal Shrinkage Ratio % | BDV V/μm | Stretchability — |
|---|---|---|---|---|---|---|---|---|---|---|---|---|
| Ex. 19 | sheet | 2.9 | 0.94 | 23 | 1 | 163 | 5.0 | 1 | 10 | 1.6 | 650 | AA |
| Com. Ex. 16 | sheet | 2.8 | 0.91 | 27 | 3 | 160 | 8.0 | 1 | 10 | 2.8 | 579 | AA |

INDUSTRIAL APPLICABILITY

The polypropylene film for a film capacitor obtained from the polypropylene for a film capacitor or the polypropylene sheet for a film capacitor of the present invention, can make the film thin, has high breakdown voltage and small thermal shrinkage ratio, and therefore can provide a small-sized film capacitor with large capacity, which can greatly contribute, for example, to allowing hybrid automobiles to have higher output, smaller size and lighter weight.

The invention claimed is:

1. A polypropylene for a film capacitor which is obtained by irradiating a propylene homopolymer with a radiation with an dose of 0.1 to 500 kGy. wherein the propylene homopolymer has:
   (1) a melt flow rate (MFR) within a range of 1 to 10 g/10 min as determined at 230° C. under a load of 2.16 kg in accordance with ASTM D1238,
   (2) an isotactic pentad traction (mmmm fraction) of not less than 98% as determined using $^{13}$C-NMR,
   (3) an ash amount of not more than 20 ppm as obtained by completely burning the propylene homopolymer in air,
   (4) a chlorine amount of not more than 10 ppm as determined by ion chromatography, and
   (5) a melting point (Tm) of not lower than 166° C. as measured by differential scanning calorimetry (DSC).

2. The polypropylene for a film capacitor according to claim 1, wherein the radiation is an electron beam or a gamma ray.

3. A polypropylene sheet for a film capacitor which is obtained by irradiating a sheet obtained from a propylene homopolymer with a radiation with an dose of 0.1 to 500 kGy, wherein the propylene homopolymer has:
   (1) a melt flow rate (MFR) within a range of 1 to 10 g/10 min as determined at 230° C. under a load of 2.16 kg in accordance with ASTM D1238,
   (2) an isotactic pentad fraction (mmmm fraction) of not less than 98% as determined using —C-NMR,
   (3) an ash amount of not more than 20 ppm as obtained by completely burning the propylene homopolymer in air,
   (4) a chlorine amount of not more than 10 ppm as determined by ion chromatography, and
   (5) a melting point (Tm) of not lower than 166° C. as measured by differential scanning calorimetry (DSC).

4. The polypropylene sheet for a film capacitor according to claim 3, wherein the radiation is an electron beam or a gamma ray.

5. The polypropylene for a film capacitor according to claim 1. which is obtained by adding a cross-linking agent to the propylene homopolymer.

6. The polypropylene sheet for a film capacitor according to claim 3, which is obtained by adding a cross-linking agent to the propylene homopolymer.

7. The polypropylene for a film capacitor according to claim 5, which is obtained by adding 0.01 to 10% by weight of a cross-linking agent to 100% by weight of the propylene homopolymer.

8. The polypropylene sheet for a film capacitor according to claim 6, which is obtained by adding 0.01 to 10% by weight of a cross-linking agent to 100% by weight of the propylene homopolymer.

9. The polypropylene for a film capacitor according to claim 1, wherein the dose of the irradiation is 1 to 300 KGy.

10. The polypropylene sheet for a film capacitor according to claim 3, wherein the dose of the irradiation is 1 to 300 KGy.

11. The polypropylene for a film capacitor according to claim 1, wherein the propylene homopolymer is in any form of powders, granules and pellets.

12. A polypropylene sheet for a film capacitor which is obtained from the polypropylene for a film capacitor according to claim 1.

13. A polypropylene film for a film capacitor which is obtained by biaxially stretching the polypropylene sheet according to claim 3.

14. A film capacitor comprising the polypropylene film for a film capacitor according to claim 13.

15. A method for producing a polypropylene for a film capacitor which comprises irradiating a propylene homopolymer with a radiation with an dose of 0.1 to 500 kGy, wherein the propylene homopolymer has:
   (1) a melt flow rate (MFR) within a range of 1 to 10 g/10 min as determined at 230° C. under a load of 2.16 kg in accordance with ASTM D1238,
   (2) an isotactic pentad fraction (mmmm fraction) of not less than 98% as determined using $^{13}$C-NMR,
   (3) an ash amount of not more than 20 ppm as obtained by completely burning the propylene homopolymer in air,
   (4) a chlorine amount of not more than 10 ppm as determined by ion chromatography, and
   (5) a melting point (Tm) of not lower than 166° C. as measured by differential scanning calorimetry (DSC).

16. A method for producing a polypropylene sheet for a film capacitor which comprises irradiating a sheet obtained from a propylene homopolymer with a radiation with an dose of 0.1 to 500 kGy, wherein the propylene homopolymer has:
   (1) a melt flow rate (MFR) within a range of 1 to 10 g/10 min as determined at 230° C. under a load of 2.16 kg in accordance with ASTM D1238,
   (2) an isotactic pentad fraction (mmmm fraction) of not less than 98% as determined using $^{13}$C-NMR,
   (3) an ash amount of not more than 20 ppm as obtained by completely burning the propylene homopolymer in air,
   (4) a chlorine amount of not more than 10 ppm as determined by ion chromatography, and
   (5) a melting point (Tm) of not lower than 166° C. as measured by differential scanning calorimetry (DSC).

17. The method for producing a polypropylene for a film capacitor according to claim 15, which comprises adding a cross-linking agent to the propylene homopolymer.

18. The method for producing a polypropylene sheet for a film capacitor according to claim 16, which comprises adding a cross-linking agent to the propylene homopolymer.

19. A method for producing a polypropylene film for a film capacitor which comprises:
   a step (I) for producing a propylene homopolymer having:
   (1) a melt flow rate (MFR) within a range of 1I to 10 g/10 min as determined at 230° C. under a load of 2.16 kg in accordance with ASTM D1238,
   (2) an isotactic pentad fraction (mmmm fraction) of not less than 98% as determined using $^{13}C\text{-}NMR$,
   (3) an ash amount of not more than 20 ppm as obtained by completely burning the propylene homopolymer in air,
   (4) a chlorine amount of not more than 10 ppm as determined by ion chromatography, and
   (5) a melting point (Tm) of not lower than 166° C. as measured by differential scanning calorimetry (DSC);
   a step (II) for producing a sheet from the propylene homopolymer; and
   a step (III) for producing a stretched film from the sheet, wherein the method comprises the step for irradiating the propylene homopolymer obtained in the step (I) or the sheet obtained in the step (II) with an electron ray with an dose of 0.1 to 500 kGy.

20. The method for producing a polypropylene film for a film capacitor according to claim 19, which comprises adding a cross-linking agent to the propylene homopolymer.

* * * * *